United States Patent
Wildgrube et al.

(10) Patent No.: US 11,897,401 B2
(45) Date of Patent: Feb. 13, 2024

(54) INTEGRATED OPERATOR CENTRIC CONTROLS

(71) Applicant: Oshkosh Corporation, Oshkosh, WI (US)

(72) Inventors: Grant Wildgrube, Fairbult, MN (US); Joshua D. Rocholl, Rochester, MN (US); Cody D. Clifton, Mapleton, MN (US); John T. Kellander, Oronoco, MN (US)

(73) Assignee: Oshkosh Corporation, Oshkosh, WI (US)

(*) Notice: Subject to any disclaimer, the term of this patent is extended or adjusted under 35 U.S.C. 154(b) by 150 days.

(21) Appl. No.: 17/372,041

(22) Filed: Jul. 9, 2021

(65) Prior Publication Data

US 2021/0331636 A1    Oct. 28, 2021

Related U.S. Application Data (63) Continuation of application No. 17/007,163, filed on Aug. 31, 2020, now Pat. No. 11,059,436, which is a
(Continued)

(51) Int. Cl.
| | |
|---|---|
| *B60R 16/023* | (2006.01) |
| *B60K 35/00* | (2006.01) |
| *B65F 3/14* | (2006.01) |
| *B28C 5/42* | (2006.01) |
| *G05D 17/02* | (2006.01) |

(Continued)

(52) U.S. Cl.
CPC .......... *B60R 16/0231* (2013.01); *B28C 5/422* (2013.01); *B60K 35/00* (2013.01); *B65F 3/041* (2013.01); *B65F 3/14* (2013.01); *G05D 17/02* (2013.01); *B60K 37/06* (2013.01); *B60K 2370/148* (2019.05);
(Continued)

(58) Field of Classification Search
None
See application file for complete search history.

(56) References Cited

U.S. PATENT DOCUMENTS 4,792,783 A  * 12/1988  Burgess ................ B62D 1/046
                                                340/461
4,854,406 A     8/1989  Appleton et al.
(Continued)

FOREIGN PATENT DOCUMENTS

| CN | 1549778 A | * 11/2004 | ............ B60K 37/06 |
|---|---|---|---|
| CN | 106742982 | 5/2017 | |

(Continued)

*Primary Examiner* — Daniel L Greene
(74) *Attorney, Agent, or Firm* — Foley & Lardner LLP (57) ABSTRACT

A vehicle includes a chassis, a non-working component, a working component, a control interface module, and a control interface. The non-working component is coupled to the chassis and configured to facilitate transit operations for the vehicle. The working component is coupled to the chassis and configured to move relative to the chassis. The control interface module is communicably coupled to the working component and the non-working component. The control interface is communicably coupled to the control interface module and configured to control operations of the working component and the non-working component.

20 Claims, 6 Drawing Sheets

Related U.S. Application Data continuation of application No. 16/789,172, filed on Feb. 12, 2020.

(60) Provisional application No. 62/805,797, filed on Feb. 14, 2019.

(51) Int. Cl.
*B65F 3/04* (2006.01)
*B60K 37/06* (2006.01)
*B65F 3/02* (2006.01)

(52) U.S. Cl.
CPC ............... *B60K 2370/1446* (2019.05); *B60K 2370/782* (2019.05); *B65F 2003/0283* (2013.01)

(56) References Cited

U.S. PATENT DOCUMENTS

| | | | |
|---|---|---|---|
| 6,253,131 | B1 | 6/2001 | Quigley et al. |
| 7,210,890 | B2 * | 5/2007 | Curotto .................. B65F 3/041 414/501 |
| 7,792,618 | B2 | 9/2010 | Quigley et al. |
| 8,459,619 | B2 | 6/2013 | Trinh et al. |
| 8,606,373 | B2 | 12/2013 | Lozier et al. |
| 9,127,738 | B2 | 9/2015 | Ellifson et al. |
| 9,303,715 | B2 | 4/2016 | Dillman et al. |
| 9,428,334 | B2 | 8/2016 | Whitfield et al. |
| 9,526,447 | B2 | 12/2016 | Naboulsi |
| 9,579,969 | B2 | 2/2017 | Crist et al. |
| 9,694,671 | B2 | 7/2017 | Wildgrube et al. |
| 9,731,594 | B2 | 8/2017 | Wildgrube |
| 9,754,382 | B1 | 9/2017 | Rodoni |
| 9,764,894 | B2 | 9/2017 | Steege et al. |
| 9,765,841 | B2 | 9/2017 | Ellifson et al. |
| 9,902,559 | B2 | 2/2018 | Parker |
| 9,944,145 | B2 | 4/2018 | Dillman et al. |
| 10,030,737 | B2 | 7/2018 | Dillman et al. |
| 10,106,032 | B2 | 10/2018 | Crist et al. |
| 10,350,956 | B2 | 7/2019 | Dillman et al. |
| 10,414,067 | B2 | 9/2019 | Datema et al. |
| 10,422,403 | B2 | 9/2019 | Ellifson et al. |
| 10,572,405 | B1 | 2/2020 | Shen et al. |
| 11,400,914 | B2 | 8/2022 | Malone et al. |
| 2002/0182044 | A1 | 12/2002 | Yu |
| 2003/0031543 | A1 | 2/2003 | Elbrink |
| 2004/0000351 | A1 | 1/2004 | Cao et al. |
| 2004/0000778 | A1 | 1/2004 | Ouellette |
| 2004/0002794 | A1 * | 1/2004 | Pillar .................. B65F 3/045 701/1 |
| 2004/0263099 | A1 | 12/2004 | Maslov et al. |
| 2005/0021190 | A1 | 1/2005 | Worrell et al. |
| 2005/0039969 | A1 | 2/2005 | Laukkanen |
| 2005/0052080 | A1 | 3/2005 | Maslov et al. |
| 2005/0131600 | A1 | 6/2005 | Quigley et al. |
| 2005/0219062 | A1 | 10/2005 | Van Bosch et al. |
| 2006/0026017 | A1 | 2/2006 | Walker |
| 2006/0206246 | A1 | 9/2006 | Walker |
| 2007/0173987 | A1 | 7/2007 | Rowe et al. |
| 2010/0179912 | A1 | 7/2010 | Curotto |
| 2011/0052364 | A1 | 3/2011 | McCulloch |
| 2014/0201004 | A1 | 7/2014 | Parundekar et al. |
| 2015/0321351 | A1 | 11/2015 | Kapoor et al. |
| 2016/0288796 | A1 | 10/2016 | Yuan |
| 2017/0130405 | A1 | 5/2017 | Engelmann |
| 2017/0197565 | A1 | 7/2017 | Yoneyama et al. |
| 2017/0275851 | A1 * | 9/2017 | Huber .................. B60N 2/797 |
| 2017/0341860 | A1 * | 11/2017 | Dodds .................. B60P 1/50 |
| 2018/0188744 | A1 | 7/2018 | Switkes et al. |
| 2018/0335104 | A1 | 11/2018 | Dillman et al. |
| 2019/0047413 | A1 | 2/2019 | Crist et al. |
| 2019/0121353 | A1 | 4/2019 | Datema et al. |
| 2019/0241072 | A1 * | 8/2019 | Darby .................. B60K 37/06 |
| 2019/0308480 | A1 | 10/2019 | Dillman et al. |
| 2019/0308570 | A1 | 10/2019 | Janisch et al. |
| 2019/0316650 | A1 | 10/2019 | Dillman et al. |
| 2019/0325220 | A1 | 10/2019 | Wildgrube et al. |
| 2019/0338823 | A1 | 11/2019 | Ellifson et al. |
| 2019/0344475 | A1 | 11/2019 | Datema et al. |
| 2020/0061811 | A1 | 2/2020 | Iqbal et al. |
| 2020/0207293 | A1 | 7/2020 | Park et al. |
| 2020/0213149 | A1 | 7/2020 | Takeuchi et al. |
| 2020/0230842 | A1 | 7/2020 | Datema et al. |
| 2020/0262366 | A1 | 8/2020 | Wildgrube et al. |
| 2020/0265656 | A1 | 8/2020 | Koga et al. |
| 2020/0307476 | A1 | 10/2020 | Chen |
| 2020/0342752 | A1 | 10/2020 | Beaulieu |
| 2021/0078512 | A1 | 3/2021 | Ghannam et al. |
| 2021/0237798 | A1 | 8/2021 | Yamada |
| 2021/0291821 | A1 | 9/2021 | Dakemoto et al. |
| 2022/0026920 | A1 | 1/2022 | Ebrahimi Afrouzi et al. |
| 2022/0066456 | A1 | 3/2022 | Ebrahimi Afrouzi et al. |
| 2022/0187841 | A1 | 6/2022 | Ebrahimi Afrouzi et al. |
| 2022/0229446 | A1 | 7/2022 | Switkes et al. |

FOREIGN PATENT DOCUMENTS

| | | | |
|---|---|---|---|
| CN | 107826568 | | 8/2018 |
| DE | 29508760 | | 12/1995 |
| EP | 1 046 565 | | 10/2000 |
| GB | 2 256 916 | A | 12/1992 |
| JP | 4283568 | | 9/2004 |
| KR | 20020092957 | A | 12/2002 |
| WO | WO-0160650 | A1 * | 8/2001 ............ B60K 35/00 |
| WO | WO-2009/105263 | | 8/2009 |

* cited by examiner

INTEGRATED OPERATOR CENTRIC CONTROLS

CROSS-REFERENCE TO RELATED PATENT APPLICATIONS

The present application is a continuation of U.S. patent application Ser. No. 17/007,163, filed Aug. 31, 2020 and issued as U.S. Pat. No. 11,059,436 on Jul. 13, 2023, which is a continuation of U.S. patent application Ser. No. 16/789,172, filed Feb. 12, 2020, which claims the benefit of and priority to U.S. Provisional Patent Application No. 62/805,797, filed Feb. 14, 2019, all of which are hereby incorporated by reference in their entireties.

BACKGROUND

Refuse trucks (e.g., garbage trucks) and concrete mixers are sometimes manufactured by adding components to rolling chassis configurations sold by original equipment manufacturers (OEMs). For example, a refuse truck may be manufactured by adding a refuse cab, a refuse body (e.g. refuse collection body), and other refuse-specific components to an OEM vehicle chassis. A concrete mixer may be manufactured by adding a mixer cab, a mixer body (e.g., a mixing drum), and other mixer-specific components to an OEM vehicle chassis. The rolling chassis configuration may include an engine, drivetrain, and associated user controls, inputs, etc. that are required to facilitate movement of the vehicle between different locations. The rolling chassis configuration may include control interfaces in a cab of the vehicle to facilitate operation of the OEM vehicle chassis. Because the refuse- or mixer-specific components are added on after manufacture (by the OEM) of the original rolling chassis configuration, controls for refuse- or mixer-specific components are traditionally added on and separate from the OEM controls. This produces duplicative, and in some instances inelegant, controls interfaces.

SUMMARY OF THE INVENTION

One embodiment of the present disclosure relates to a vehicle. The vehicle includes a chassis, a non-working component, a working component, a control interface module, and a control interface. The non-working component is coupled to the chassis and configured to facilitate transit operations for the vehicle. The working component is coupled to the chassis and configured to move relative to the chassis. The control interface module is communicably coupled to the working component and the non-working component. The control interface is communicably coupled to the control interface module and configured to control operations of the working component and the non-working component.

Another embodiment of the present disclosure relates to a control system. The control system includes a control interface mountable in a cab area of a vehicle and a control interface module. The control interface is configured to receive user commands and to control a working component of the vehicle, where the working component facilitates non-transit operations of the vehicle. The control interface module is communicably coupled to the control interface and is further communicably couplable to the working component and to a non-working component of the vehicle, where the non-working component facilitates transit operations of the vehicle. The control interface module receives user commands from the control interface and control the working component and non-working component based on the user commands. The control interface module is configured to change the operation of the control interface to control the non-working component.

Yet another embodiment of the present disclosure relates to a vehicular communications network. The vehicular communications network includes a plurality of control modules, a control interface, and a control interface module. The plurality of control modules include a first control module configured to control operation of a working component of a vehicle and a second control module configured to control operations of a non-working component of the vehicle. The working component facilitates non-transit operations of the vehicle and the non-working component facilitates transit operations of the vehicle. The control interface is configured to receive user commands and control at least one of the plurality of control modules. The control interface further includes a plurality of operation modes including a first operation mode in which the user commands control the first control module, and a second operation mode in which the user commands control the second control module. The control interface module is communicably coupled to the control interface and the plurality of control modules, and is configured to change the operation mode of the control interface.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

A vehicle may include both working and non-working components. As referred to herein, the term "non-working components" generally refers to components that are included in the vehicle as part of a rolling chassis structure (e.g., configuration) sold by an original equipment manufacturer (OEM). The non-working components may be configured to facilitate transit operations (e.g., vehicle movement, steering, operator entertainment, etc.). For example, the non-working components may include electrical components in a cab area of the vehicle such as dashboard displays, radios, etc. The non-working components may be controlled using a control interface that is included with the rolling vehicle chassis. The control interface may be also be included in the cab area of the vehicle for ease of operation. The term "working component" generally refers to components that are added to the rolling chassis configuration after manufacture by the OEM. The working components may be configured to facilitate non-transit operations (e.g., working vehicle operations) such as manipulating a position of one or more hydraulic cylinders, controlling rotation and/or movement of other working body components, and other operations that may be performed while the vehicle is both moving and stationary. According to an exemplary embodiment, the working components and/or sub-components thereof are configured to move relative to the chassis of the vehicle. For example, the working components may include pumps, motors, hydraulic and/or pneumatic actuators, and other moving components specific to the final application of the vehicle.

According to an exemplary embodiment, the vehicle utilizes the control interface, included with the rolling chassis configuration from the OEM, to control the working components of the vehicle. Among other benefits, integrating the working component controls with existing user interfaces in the cab of the vehicle greatly reduces the number of additional control systems added to the cab. Utilizing existing user interfaces also increases operator productivity by providing the working component controls within immediate reach of the operator, rather than at some secondary location on the vehicle (e.g., a secondary location that is separate from the OEM control interface(s), outside the vehicle, etc.). According to an exemplary embodiment, the control interface includes a plurality of actuators. At least one of the actuators is configured to cause (e.g., control) movement of a working component. For example, the actuators may be configured to cause a hydraulic cylinder to extend and/or retract to manipulate a position of the working component. In other embodiments, the actuators may activate or otherwise control the operation of a pump for a hydraulic system (e.g., a drum drive system for a concrete mixer, etc.). In yet other embodiments, the actuators may facilitate control of another application specific component for the vehicle. In some embodiments, at least one actuator of the control interface may be configured to control both a working component of the vehicle and a non-working component of the vehicle, which can, advantageously, reduce the overall number of actuators required for operational control of all components of the vehicle (e.g., the combination of both working and non-working components).

An embodiment of the present disclosure relates to a vehicle including a chassis, a working component, and a non-working component. Both the working component and the non-working component are coupled to the chassis. The working component is configured to move relative to the chassis. The vehicle also includes a control interface that is communicably coupled to the working component and the non-working component. The control interface includes a plurality of actuators. A first actuator of the plurality of actuators is configured to control the working component. A second actuator of the plurality of actuators is configured to control a non-working component.

Another embodiment of the present disclosure relates to a vehicle including a chassis, a working component, and a non-working component. Both the working component and the non-working component are coupled to the chassis. The working component and/or sub-components thereof are configured to move relative to the chassis. The vehicle also includes a control interface communicably coupled to the working component and the non-working component. The control interface includes an actuator. The actuator is configured to control both the working component and the non-working component. The details of the general depictions provided above will be more fully explained by reference to FIGS. 1-8.

Figure 1:
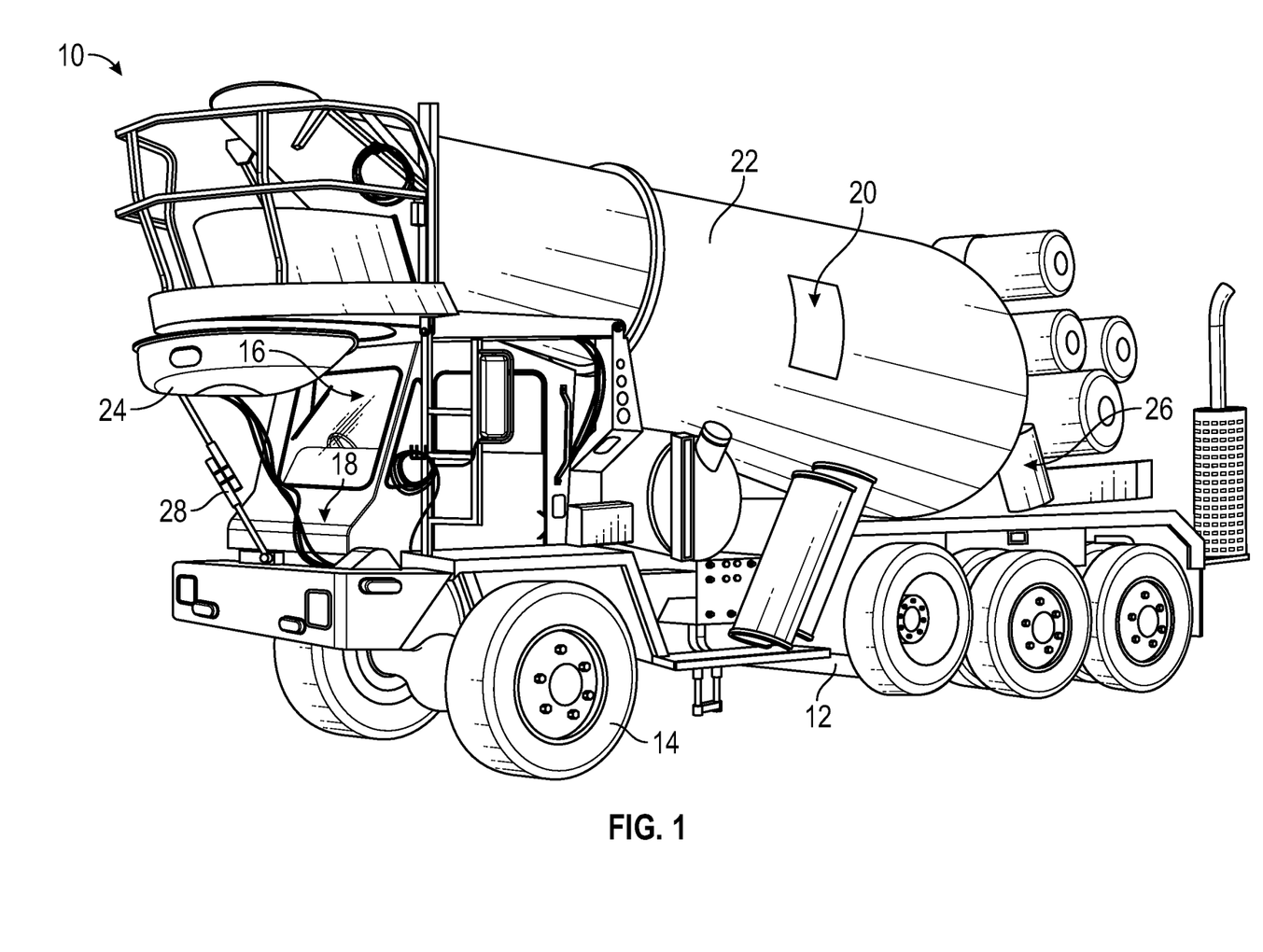
FIG. 1 is a front perspective view of a concrete mixer, according to an exemplary embodiment.

According to an exemplary embodiment shown in FIG. 1, a vehicle, shown as concrete mixer 10 (e.g., mixer truck, cement mixer, etc.), is configured as a concrete mixing and delivery vehicle. The concrete mixer 10 is configured to transport a cement mixture (e.g., aggregate such as sand or gravel, water, and/or other adhesive compounds) from a quarry or cement production facility to various locations for distribution (e.g., a residence, a commercial property, a construction site, etc.). In the exemplary embodiment of FIG. 1, the concrete mixer 10 is manufactured by adding working components to a rolling vehicle chassis structure (e.g., configuration, etc.). The rolling vehicle chassis structure may be manufactured and sold by an OEM for a variety of different end-use applications (e.g., end-use applications with similar load and stability requirements, etc.). For example, the rolling vehicle chassis structure may be manufactured for use as a concrete mixer, refuse truck, or another type of working vehicle.

As shown in FIG. 1, the rolling vehicle chassis configuration includes components that are configured to facilitate transport operations for the concrete mixer 10 (e.g., to facilitate movement of the concrete mixer 10 between different locations). The rolling vehicle chassis structure includes a chassis, shown as frame 12, and a plurality of tractive elements, shown as wheels 14, coupled thereto. The rolling vehicle chassis structure also includes a prime mover or engine (not shown) coupled to the frame 12. The engine may be configured to provide power to the wheels 14, and/or to other systems of the concrete mixer 10 (e.g., a pneumatic system, a hydraulic system, mixing drum rotation system, etc.). The engine may be configured to utilize one or more of a variety of fuels (e.g., gasoline, diesel, bio-diesel, ethanol, natural gas, etc.), or utilize energy from an external power source (e.g., overhead power lines, etc.) and to provide the power to the systems of the concrete mixer 10. The rolling vehicle chassis structure includes a transmission (not shown) configured to transmit energy from the engine to the wheels 14. The rolling vehicle chassis structure may also include a suspension system, fuel storage system, steering system, brake system and/or other systems to facilitate transport operations for the concrete mixer 10.

The rolling vehicle chassis structure also includes components, referred to herein as "non-working components," configured to enhance user comfort and monitor/control vehicle operations. These may include air conditioning or heating system components such as fans, thermostats, compressors, control valves, heaters, etc. These may additionally include radios for communication or entertainment, a camera system configured to provide parking assistance, displays (e.g., dashboard displays for navigation, vehicle speed reporting, health monitoring of electronic equipment, etc.), seat heaters, electric motors for windshield wiper control, an electronic control module for a cruise control system, rearview mirror position, etc. The non-working components may be disposed in a cab area 16 of the concrete mixer 10, on a first portion (e.g., end) of the frame 12. In the exemplary embodiment of FIG. 1, the non-working components are coupled directly or indirectly (e.g., mounted or otherwise connected) to a forward part of the frame 12 proximate to where an operator would be positioned in the concrete mixer 10.

The various non-working components for concrete mixer 10 may be communicably coupled (e.g., electrically connected, wirelessly connected, etc.) to a control interface module that is included as part of the rolling chassis configuration (from the OEM). The control interface module may be configured to facilitate operator interaction and control over the various non-working components for the concrete mixer 10. The control interface module may be communicably coupled to a control interface (e.g., a user interface, a human machine interface, etc.) from which a user or occupant may input desired control settings. The control interface may include a plurality of actuators such as switches, buttons, dials, etc. disposed in the cab area 16 of the concrete mixer 10. The plurality of actuators may be positioned within the cab area 16 for ease of access by a vehicle operator such as on a steering wheel or a central console within arms-reach of the occupant. According to an exemplary embodiment, a plurality of actuators is disposed on a steering wheel of a rolling vehicle chassis, as will be described with reference to FIG. 3. In other embodiments, the plurality of actuators is disposed on a center console, in an overhead region of the cab area 16, or at another suitable location within the cab area 16.

According to an exemplary embodiment, the rolling vehicle chassis for the concrete mixer 10 includes an internal communications network used for operational control of the non-working components. The internal communications network may be a controller area network (CAN bus) or another vehicle electronic communications protocol. The CAN bus may be connected (e.g., electrically connected) to at least one non-working component control module. The non-working component control module may be configured to control at least one non-working component based on a set of inputs. In an exemplary embodiment, the non-working component control module may include an engine control module configured to control the amount of air flow or fuel delivered to the engine based on a measured mass flow rate of air, fuel pressure, etc. being delivered to the engine. In other exemplary embodiments, the non-working component control module may include a radio control module configured to control volume levels, stereo operation, etc. based on a position of an actuator (e.g., a dial, switch, etc.). In yet other embodiments, the non-working component control module may include an air conditioning or heating system control module configured to control an amount of air flow, direction of air flow, etc. based on a temperature set point and a measured temperature. In yet other embodiments, the non-working component control module may include one of a camera system control module used to control camera operation based on an operating condition of the vehicle, a windshield wiper control module configured to control the operating speed of the windshield wipers based on a position of an actuator (lever, switch, etc.), a cruise control module configured to set and regulate an operating speed of the concrete mixer 10 based on an operator set point and a measured wheel speed, etc. In other embodiments, the non-working component control modules may include yet other types of control modules.

The non-working component control module may include a transmitter, onboard memory, and a processor operatively coupled to the transmitter and onboard memory. The non-working component control module may be configured to receive and process operating instructions for one or more non-working components, to generate and transmit operating instructions to other control modules, or to interpret, transmit, and receive sensor data or other operational information. In some embodiments, the non-working component control module may be configured to transmit sensor data and/or other operational information to other parts of the CAN bus for health monitoring (e.g., to prevent the operation of certain non-working component control modules under predetermined operating conditions, etc.). The CAN bus may be configured to facilitate communication between a plurality of non-working component control modules or between a non-working component control module and the control interface module.

As shown in FIG. 1, the concrete mixer 10 includes a plurality of application-specific components added to the rolling vehicle chassis configuration. The structure and arrangement of these application-specific components may be unique to a particular end-use application (e.g., concrete mixing and distribution, etc.).

According to an exemplary embodiment shown in FIG. 1, the application-specific components for the concrete mixer 10 include a cab, shown as mixer cab 18, and a body, shown as mixer body 20. Both the mixer cab 18 and the mixer body 20 are coupled to the frame 12. The mixer cab 18 is coupled to a forward portion of the frame 12. The mixer body 20 is coupled to a rear portion of the frame 12 behind the mixer cab 18. As shown in FIG. 1, the mixer body 20 for the concrete mixer 10 includes a mixing drum 22 that extends at an angle from the rear portion of the frame 12 toward the mixer cab 18 and over an upper surface of the mixer cab 18, such that one end of the mixing drum 22 is approximately centered over the mixer cab 18. The concrete mixer 10 additionally includes a delivery chute 24, which is disposed on a forward end of the concrete mixer 10, also above the upper surface of the mixer cab 18. A first end (e.g., proximal end) of the delivery chute 24 is configured to receive cement from the mixing drum 22, which flows along the delivery chute 24 toward a second end (e.g., distal end) of the delivery chute 24 along a channel defined by the delivery chute 24 between the first end and the second end. Cement is dispensed from the second end of the delivery chute 24 onto a surface (e.g., a level surface in a construction area, a form configured to receive and shape the cement, etc.). In an exemplary embodiment, the delivery chute 24 is repositionable so that cement can be distributed evenly or to different positions on the surface relative to the concrete mixer 10.

In an exemplary embodiment, the application-specific components additionally include one or more working components that are configured to facilitate working vehicle operations (e.g., mixing operations, concrete loading and unloading operations, etc.). In some embodiments, at least one of the working components moves relative to the frame 12 of the rolling vehicle chassis to facilitate working operations for the concrete mixer 10. For example, the working components may include the mixing drum 22 mounted to the frame 12 and that rotates relative to the frame 12. In other embodiments, at least one of the working components is stationary relative to the frame 12 such as motors and/or pumps used to power and/or control a hydraulic system for the concrete mixer 10. As shown in FIG. 1, a first working component for the concrete mixer 10 is a drum rotation system 26 (e.g., a drum drive system, etc.) that is configured to rotate the mixing drum 22. In some embodiments, rotation of the mixing drum 22 is powered by the engine. In other embodiments, rotation of the mixing drum 22 is powered using a separate motor, or another secondary drive system. The drum rotation system 26 may include a hydraulic system used to control rotation of the drum. The hydraulic system may include a motor, a pump, control valves to facilitate switching the flow direction through the hydraulic system (e.g., drum rotational direction), a clutch used to selectively couple the hydraulic system to an engine of the concrete mixer 10 or another power source, etc.

In the exemplary embodiment of FIG. 1, a second working component for the concrete mixer 10 is a chute position control system 28. The chute position control system 28 is configured to reposition the delivery chute 24 relative to the concrete mixer 10 (e.g., to distribute the cement to different areas relative to the frame 12 of the concrete mixer 10, etc.). The chute position control system 28 may utilize a mechanical actuator, or another mechanical positioning system to reposition the delivery chute 24. In other embodiments, the concrete mixer 10 may include additional, fewer, and/or different working components.

According to an exemplary embodiment, the concrete mixer 10 includes a working component control module. The working component control module is configured to control at least one working component based on a set of inputs. In the exemplary embodiment of FIG. 1, the concrete mixer 10 includes two working component control modules, a drum rotation control module and a chute position control module. The drum rotation control module is communicably coupled to the drum rotation system 26 and is configured to control the operation of the drum rotation system 26. The chute position control module is communicably coupled to the chute position control system 28 and is configured to control the operation of the chute position control system 28. As will be further described with reference to FIGS. 3-8, each of the working component control modules are communicably coupled (e.g., electrically connected) to the same control interface module that is used for the non-working component control modules. Among other benefits, this controls approach eliminates the need for a controls interface in the vehicle for the working components that is separate from the controls interface used for the non-working components. In other words, this controls approach eliminates the need for a controls interface that is specific to only the working components of the concrete mixer 10.

The number and type of working components added to the rolling chassis structure (from the OEM) will be different for different applications. In the exemplary embodiment of FIG. 1, the concrete mixer 10 is manufactured by adding application-specific components to the rolling chassis configuration including the mixer cab 18, the mixer body 20, and associated working components (e.g., components that move relative to the frame 12 to facilitate working operations such as cement loading, mixing, and distribution at a job site, etc.). A similar rolling chassis structure may also be utilized for other applications.

Figure 2:
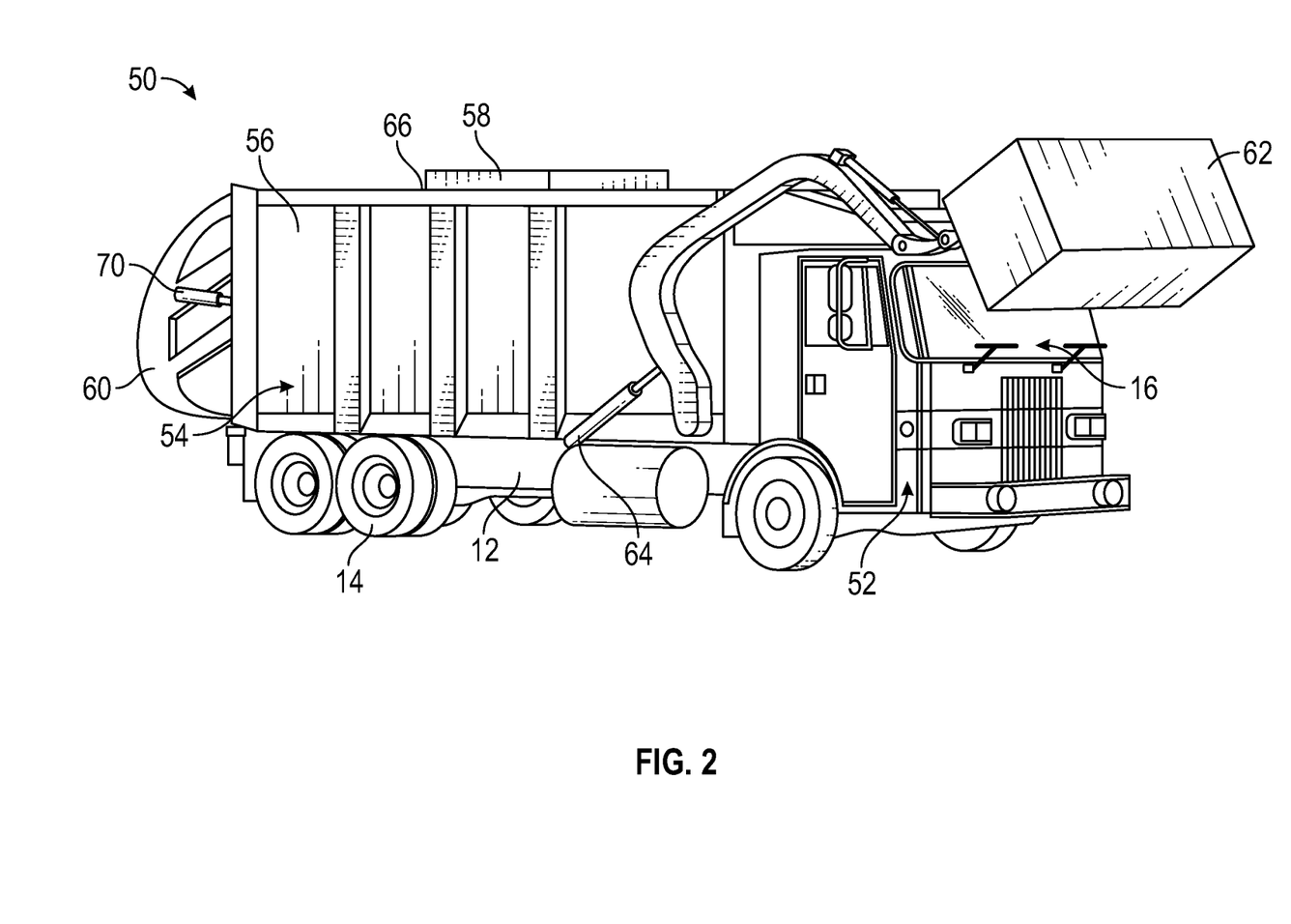
FIG. 2 is a front perspective view of a refuse truck, according to an exemplary embodiment.

According to the exemplary embodiment shown in FIG. 2, a vehicle, shown as refuse truck 50 (e.g., a garbage truck, a waste collection truck, a sanitation truck, etc.) is configured to transport refuse from various waste receptacles within a municipality to a storage and/or processing facility (e.g., a landfill, an incineration facility, a recycling facility, etc.). In an exemplary embodiment, the refuse truck 50 is assembled (e.g., manufactured, formed, etc.) from a substantially similar rolling chassis structure as the concrete mixer 10 (shown in FIG. 1). For the purposes of this disclosure, where the same figure numbering and terminology (e.g., naming convention) is used for substantially similar components, it may be assumed that the structure and function of the components are substantially similar.

As shown in FIG. 2, as with the concrete mixer 10 (FIG. 1), the rolling chassis structure for the refuse truck 50 includes components that are configured to facilitate transport operations for the refuse truck 50 (e.g., to facilitate movement of the refuse truck 50 between different locations). The rolling vehicle chassis structure includes a chassis, shown as frame 12, and a plurality of tractive elements, shown as wheels 14. The rolling vehicle chassis structure also includes an engine, a transmission, a suspension system, a fuel storage system, a steering system, a brake system and/or other systems to facilitate transport operations for the refuse truck 50.

As with the concrete mixer 10 of FIG. 1, the rolling vehicle chassis structure for the refuse truck 50 of FIG. 2 includes non-working components configured to enhance user comfort and monitor/control vehicle operations. In an exemplary embodiment, the rolling vehicle chassis structure (from the OEM) includes a control interface module configured to facilitate operator interaction and control over the various non-working components. The control interface module may be communicably coupled to a control interface (e.g., a user interface, a human machine interface, etc.) from which an occupant can input desired control settings. The control interface may include a plurality of actuators such as switches, buttons, dials, etc. The control interface (e.g., the plurality of actuators) may be located in a cab area 16 of the refuse truck 50 for ease of access by a vehicle operator such as on a steering wheel, a central console, or an overhead region of the cab area 16 within arms-reach of the user or occupant.

According to an exemplary embodiment, the rolling vehicle chassis for the refuse truck 50 includes an internal communications network used for operational control of the non-working components. The network may be connected (e.g., electrically connected) to at least one non-working component control module, which may be configured to control at least one non-working component based on a set of inputs. The non-working component control modules for the refuse truck 50 of FIG. 2 may be substantially similar to the non-working component control modules for the concrete mixer 10 of FIG. 1.

According to the exemplary embodiment shown in FIG. 2, the refuse truck 50 includes a variety of application-specific components configured to facilitate loading, storage, and unloading of refuse (e.g., garbage, trash, etc.). Among these are a cab, shown as refuse cab 52, coupled to a forward portion of the frame 12, and a body, shown as refuse body 54, coupled to a rear portion of the frame 12 behind the refuse cab 52. As shown in FIG. 2, the refuse body 54 includes a refuse container 56 configured to receive refuse and store refuse during transit operations. The refuse container 56 includes an access door 58 disposed on an upper surface of the refuse container 56 so as to prevent refuse from being accidentally discharged from the refuse container 56 during transit operations (e.g., while the refuse truck 50 is moving). The refuse body 54 additionally includes a compactor (not shown) and a repositionable rear access door 60 to facilitate refuse unloading operations. The refuse body 54 also includes a front-loading refuse container assembly 62 configured to receive refuse from residential or commercial waste receptacles and to transfer refuse into the refuse container 56 through the access door 58. In other embodiments, the refuse truck 50 may include additional, fewer, and/or different components.

In an exemplary embodiment, the application-specific components additionally include one or more working components to facilitate working operations for the refuse truck 50 (e.g., refuse loading operations, refuse compaction operations, refuse unloading operations, etc.). In some embodiments, the working components include components that move relative to the frame 12 such as hydraulic cylinders, lift arms used to eject waste/garbage from a temporary holding container into the refuse container 56, or other moving components. In other embodiments, the working components include components that are stationary relative to the frame 12 such as motors and/or pumps used to power and/or control a hydraulic system for the refuse truck 50. As shown in FIG. 2, a first working component for the refuse truck 50 is a front-end loading system 64 that is configured to reposition the front-loading refuse container assembly 62 (e.g., a temporary waste/garbage storage container used to facilitate loading operations for the refuse truck 50, etc.) relative to the frame 12 to eject the contents of the container assembly 62 into the refuse container 56. The front-end loading system 64 may include a lift arm system configured to rotate one or more lift arms mounted to the refuse container 56, to rotate the container assembly 62 from a loading position in front of the refuse truck 50 upwardly toward an unloading position above the refuse truck 50. The front-end loading system 64 may also include a fork tilt system configured to rotate the container assembly 62 about a connection point at an end of the lift arms (e.g., to rotate the container assembly 62 relative to the lift arms).

A second working component for the refuse truck 50 is an access door position control system 66. According to an exemplary embodiment, the access door position control system 66 is configured to set the position of the access door 58 during loading, transit, and unloading events (e.g., to open the access door 58 during loading events when the refuse container 56 is emptied into the refuse container 56, to close the access door during transit while the frame 12 of the refuse truck 50 is in motion, etc.). A third working component is a compaction control system (not shown) configured to actuate or otherwise move the compactor within the refuse container 56 and to compact refuse that has been received in the refuse container 56 from the front-loading refuse container assembly 62. A fourth working component is a rear access door position control system 70 configured to reposition the rear access door 60 during loading, transit, and unloading events. In some embodiments, the working components further include refuse container control system configured to raise and lower (e.g., tilt) the refuse container 56 during unloading events, and/or other working component control systems. As shown in FIG. 2, each of the working components is driven by a hydraulic actuator. In other embodiments, another other type of mechanical actuator may be used.

The number, type, and structure of the various working components described herein should not be considered limiting. Various alternatives are possible without departing from the inventive principles disclosed herein. For example, more or fewer access doors may be included as part of the refuse body 54 to facilitate access to the refuse container 56. Additionally, the type, number, and location of actuators may also differ in various exemplary embodiments.

According to an exemplary embodiment, the refuse truck 50 includes a working component control module configured to control at least one working component based on a set of inputs. In the exemplary embodiment of FIG. 2, the refuse truck 50 includes at least four working component control modules, a refuse container position control module communicably coupled to the front-end loading system 64, an access door position control module communicably coupled to the access door position control system 66, a compactor control module communicably coupled to the compaction control system, and a rear access door position control module communicably coupled to the rear access door position control system 70. In other exemplary embodiments, more or fewer working component control modules may be included. In yet other embodiments, a single working component control module may be used to control multiple working components. As will be further described with reference to FIGS. 3-8, the working component control modules are communicably coupled to the control interface module along with the non-working component control module(s) to eliminate the need for a separate controls interface that is specific to only the working components of the refuse truck 50.

Figure 3:
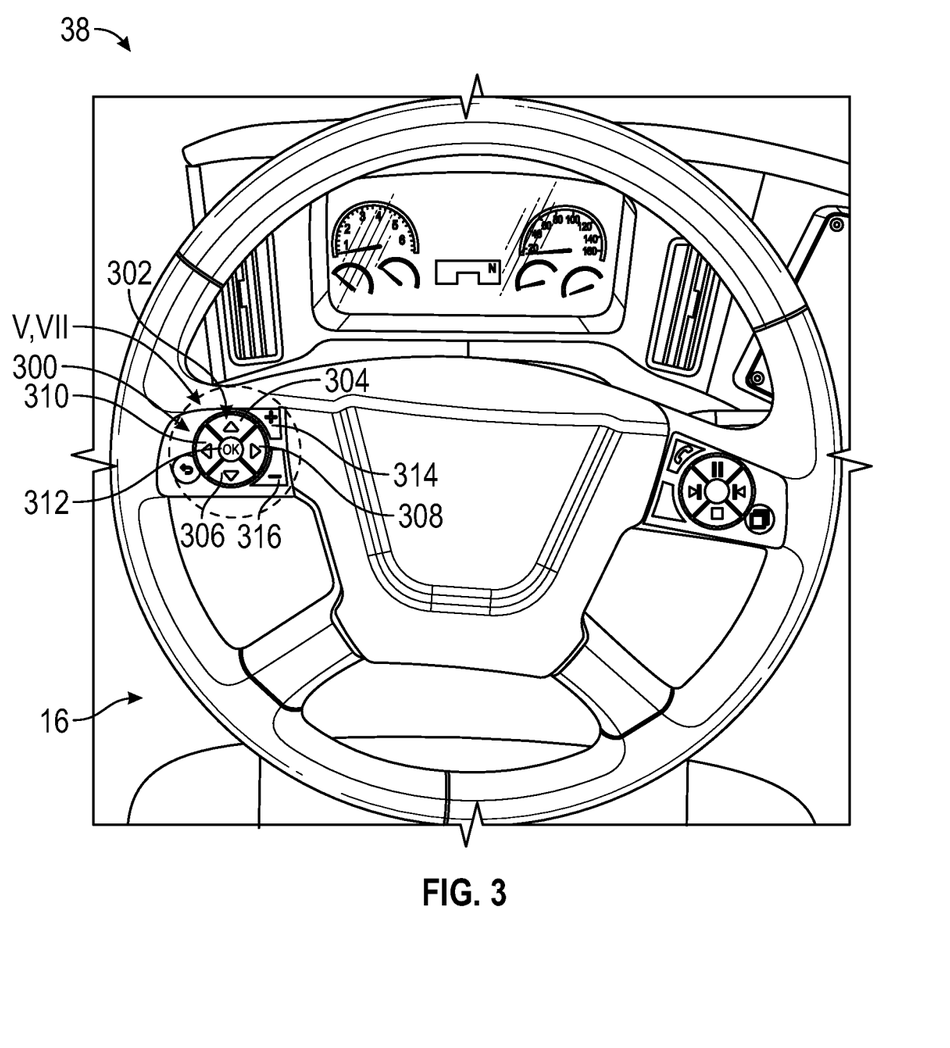
FIG. 3 is a front view of a steering wheel for a concrete mixer or a refuse truck that includes an OEM control interface, according to an exemplary embodiment.

According to the exemplary embodiment shown in FIG. 3, the rolling vehicle chassis for both the concrete mixer 10 (FIG. 1) and the refuse truck 50 (FIG. 2) include a steering wheel 38 disposed in the cab area 16 (see also FIGS. 1-2) of the vehicle. The steering wheel 38 is configured to provide operator control over the position of the wheels 14 in order to turn and maneuver the vehicle during transit operations. As shown in FIG. 3, the steering wheel 38 includes a control interface, shown as steering wheel control interface 300 disposed proximate to a side (e.g., a left side as shown in FIG. 3) of the steering wheel 38. The steering wheel control interface 300 includes a plurality of actuators, shown as buttons 302. The buttons 302 include an upper control button 304, a lower control button 306, a right control button 308, a left control button 310, a select button 312, an increase button 314, and a decrease button 316. In the exemplary embodiment of FIG. 3, the control buttons (e.g., the upper control button 304, the lower control button 306, the right control button 308, and the left control button 310) circumferentially surround the select button 312. The increase button 314 and the decrease button 316 are positioned to the side (e.g., right side as shown in FIG. 3) of the right control button 308. In other embodiments, the arrangement of buttons on the steering wheel 38 may be different. For example, the buttons may be repositioned on a right side of the steering wheel, or at another position along the steering wheel. In other embodiments, the plurality of actuators for the control interface 300 may be disposed on a switch and/or lever behind the steering wheel 38. In yet other embodiments, the plurality of actuators for the control interface 300 may be disposed on the center console, a dash in front of the operator, the center console, an overhead area, or another location in the cab area.

Figure 4:
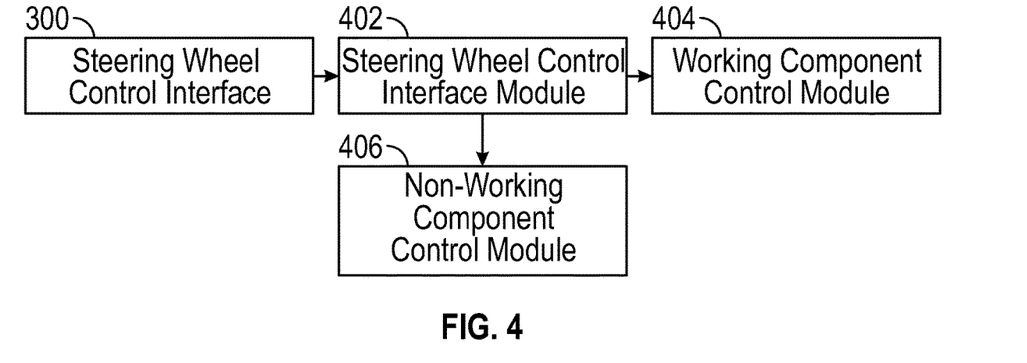
FIG. 4 is a block diagram of an internal communication network for a vehicle, according to an exemplary embodiment.

In the exemplary embodiment of FIGS. 3-4, the steering wheel control interface 300 forms part of a human-machine interface (e.g., a user interface) for the vehicle that enables a user or vehicle operator to control the operation of one or more non-working components (e.g., to control the volume of a radio in the cab area or another electronic component, to navigate through options and make selections for a radio or another electronic component, to control the dashboard display, etc.). In other exemplary embodiments, the number, structure, and type of actuators used for the steering wheel control interface 300 may be different. For example, one or more buttons 302 may be replaced with switches, toggles, dials, or another form of actuator.

According to the exemplary embodiment of FIG. 4, the steering wheel control interface 300 is communicably coupled to a control interface module for the vehicle, shown as steering wheel control interface module 402. The steering wheel control interface module 402 is communicably coupled (e.g., electrically connected) to a working component control module 404 and a non-working component control module 406. The working component control module 404 may include one or more of the working component control modules described herein for the concrete mixer 10 (FIG. 1) and the refuse truck 50 (FIG. 2), or one or more working component control modules used in another application-specific vehicle type (e.g., a vehicle manufactured by adding application-specific components to an OEM rolling chassis configuration). In this way, control interfaces that are originally (e.g., natively, as received from the OEM, etc.) configured for controlling non-working components (e.g., non-working components included with the rolling chassis structure) may be repurposed to allow an operator to also control the working components. Among other benefits, utilizing the OEM control interfaces reduces the number of additional control interfaces that need to be added to the cab area 16 (see also FIGS. 1-2) to control the working components. Furthermore, using a steering wheel control interface 300 to control the working components, or another control interface included as part of the rolling vehicle chassis to control working components, increases operator productivity by providing the working component controls within immediate reach of the operator.

A variety of different methods are possible to integrate the working component controls with the steering wheel control interface 300 or another control interface for the rolling vehicle chassis. According to an exemplary embodiment, the working component control modules are each integrated directly into the internal communications network for the vehicle. The working component control modules may be hardwired (e.g., electrically connected) to the internal communications network in place of one or more non-working component control modules included with the rolling chassis configuration. In other exemplary embodiments, the working component control modules may be integrated into the internal communications network using one of a variety of multiplexing techniques known to those of ordinary skill in the art. Advantageously, using a multiplexing technique may allow the control interface to be used for simultaneous control of both working and non-working components. In yet other exemplary embodiments, one or more buttons 302 may be repurposed as a function control switch configured to allow the operator to selectively control either a working component or a non-working component with the same buttons 302. For example, the function control switch may be configured to toggle between two modes of operation, a first mode in which at least one button 302 controls a non-working component, and a second mode in which the least one button controls a working component. In yet other exemplary embodiments, only a subset (e.g., one or more buttons of the plurality of buttons 302, etc.) is used to control a working component, while the remaining buttons 302 retain their original functionality (e.g., the remaining buttons 302 control a non-working component of the vehicle).

The methods described herein to reconfigure the steering wheel control interface 300, or other control interfaces included with the rolling vehicle chassis, should not be considered limiting. Various other techniques may be implemented in order to utilize the OEM control interfaces to control the working components. For example, the OEM control interface may utilize a wireless communications protocol (e.g., Wi-Fi, Bluetooth, etc.) to communicate with non-working components. In such an embodiment, the working component control modules may need to be configured to receive wireless communication signals in order to receive and process information from the OEM control interface.

Figure 5:
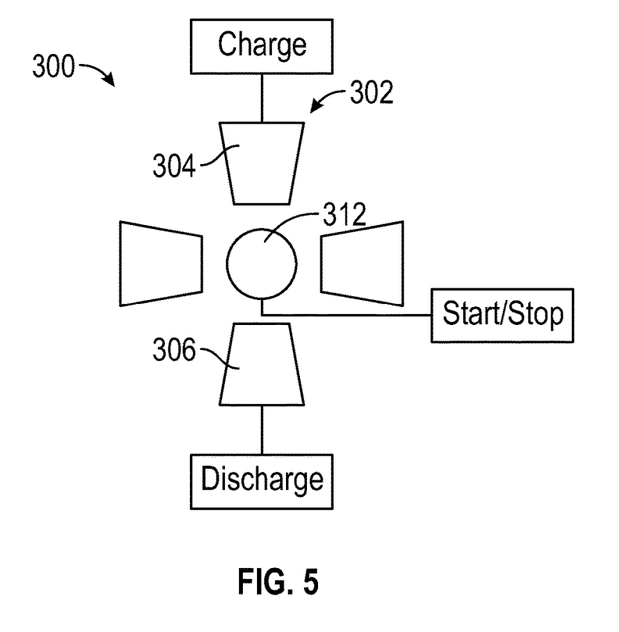
FIG. 5 is a schematic layout of an OEM steering wheel control interface for a concrete mixer, according to an exemplary embodiment.
Figure 6:
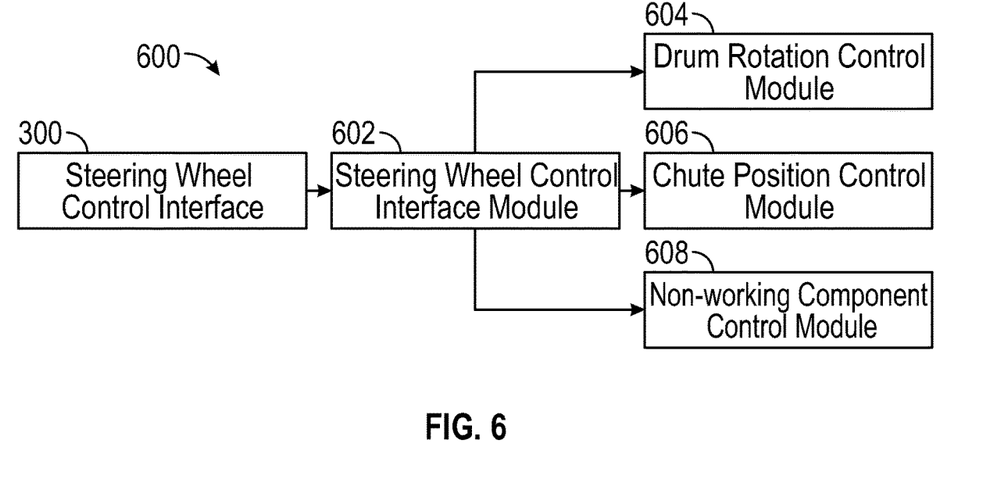
FIG. 6 is a block diagram of an internal communication network for a concrete mixer, according to an exemplary embodiment.

According to the exemplary embodiment shown in FIGS. 5-6, the steering wheel control interface 300 may be used to control the working components of the concrete mixer 10 (see also FIG. 1). In the exemplary embodiment of FIG. 5, a subset of the buttons 302 of the steering wheel control interface 300 are used to control the operation of the working components. In other exemplary embodiments, more or fewer buttons 302 from the steering wheel control interface 300 may be used. As shown in FIG. 5, the upper control button 304 and the lower control button 306 are configured to control charge and discharge operations for the mixing drum 22 (e.g., to modify the rotational direction of the mixing drum 22, etc.). The select button 312 is configured to activate or deactivate rotation of the mixing drum 22. The remaining steering wheel control interface buttons 302 are used to control one or more non-working components.

As shown in FIG. 6, the steering wheel control interface 300 for the concrete mixer 10 (see also FIG. 1) is communicably coupled to a control interface module, shown as steering wheel control interface module 602, on the internal communications network 600 (e.g., CAN bus, etc.). The internal communications network for the concrete mixer 10 includes working component control modules, shown as drum rotation control module 604 and chute position control module 606. In the exemplary embodiment of FIG. 6, the internal communications network also includes a non-working component control module 608. The non-working component control module 608 may be one of a variety of different non-working component control modules included with the rolling chassis configuration from the OEM. Among other functions, the steering wheel control interface module 602 may be configured to determine routing of instructions or a control signal to any one of the control modules (e.g., drum rotation control module 604, chute position control module 606, and non-working component control module 608) depending on which buttons 302 (see FIG. 4) are depressed (e.g., activated or deactivated). In the exemplary embodiment of FIG. 5, the buttons 302 have only been assigned to control rotation of the mixing drum 22. In other exemplary embodiments, the left control button 310 and the right control button 308, or another set of buttons on the steering wheel control interface 300, may be used to reposition the delivery chute 24.

Figure 7:
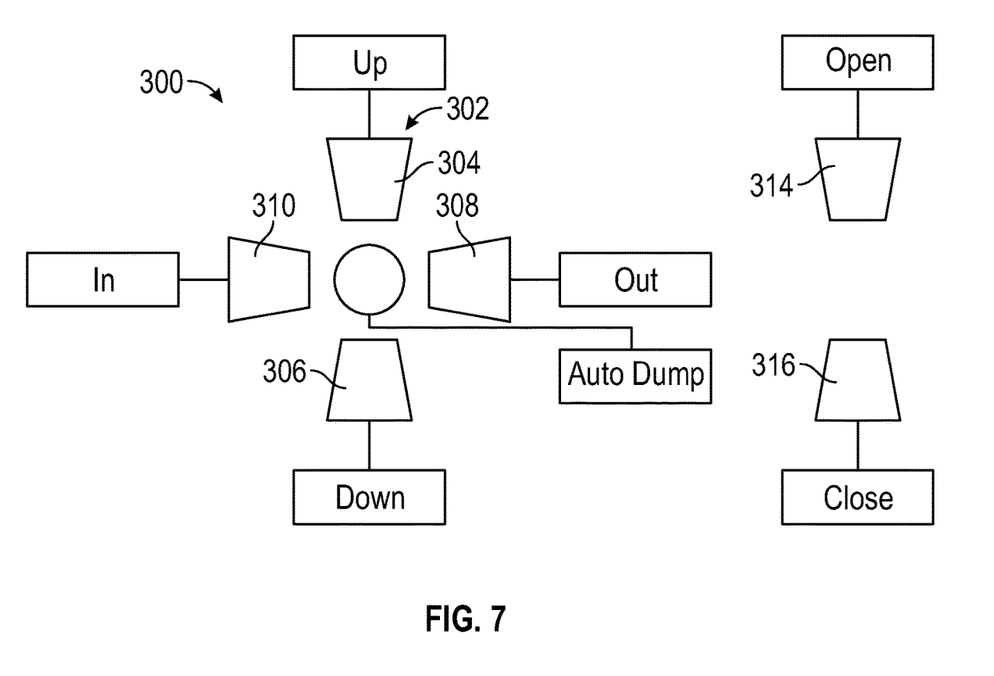
FIG. 7 is a schematic layout of an OEM steering wheel control interface for a refuse truck, according to an exemplary embodiment.
Figure 8:
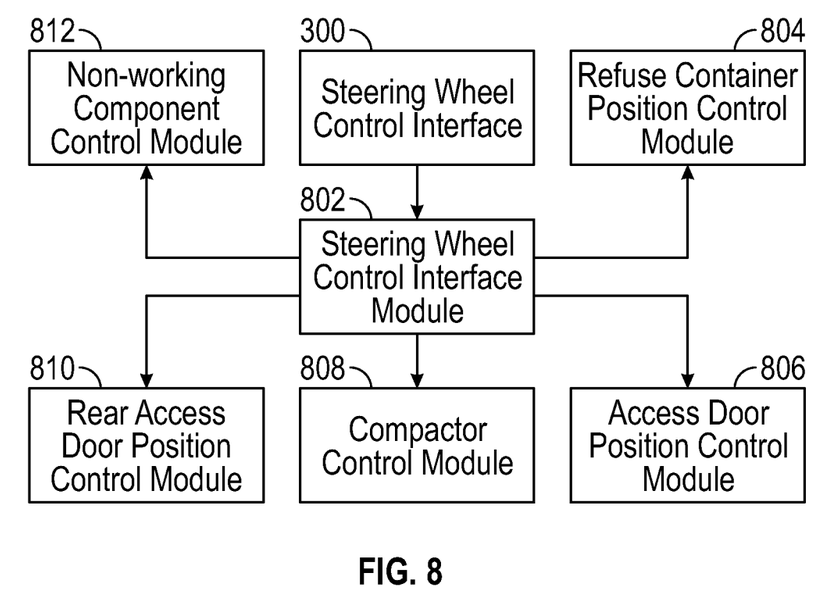
FIG. 8 is a block diagram of an internal communication network for a refuse truck, according to an exemplary embodiment.

FIGS. 7-8 show an example of how the steering wheel control interface 300 may be repurposed to control the working components of the refuse truck 50 (FIG. 2). As shown in FIG. 7, each of the buttons 302 of the steering wheel control interface 300 is used to control the operation of a working component of the refuse truck 50. In other exemplary embodiments, additional, fewer, and/or different buttons 302 from the steering wheel control interface 300 may be used, or additional buttons from other OEM control interfaces may be used. As shown in FIG. 7, the upper control button 304 and the lower control button 306 are configured to control raising and lowering operations for the front-end loading refuse container assembly 62. The left control button 310 and the right control button 308 are configured to control the compactor (e.g., the left control button 310 causes the compactor to engage, while the right control button 308 causes the compactor to disengage). The select button 312, once depressed (e.g., activated), is configured to generate a user command (e.g., operator command, control signal, etc.) to cause the rear access door 60 to open to eject refuse from the refuse container 56. In an exemplary embodiment, the select button 312 is also configured to raise one end of the refuse container 56, to more fully empty the contents of the refuse container 56. In some embodiments, releasing the select button 312 (e.g., deactivating the select button) may cause the refuse container 56 and the rear access door 60 to be repositioned (e.g., may cause the refuse container 56 to be lowered and the rear access door 60 to be closed) so that the refuse truck 50 may continue refuse collection/loading operations. In the exemplary embodiment of FIG. 7, the increase button 314 and the decrease button 316 are configured to open and close the access door 58.

According to the exemplary embodiment shown in FIG. 8, the steering wheel control interface 300 for the refuse truck 50 (see also FIG. 2) is communicably coupled to a control interface module, shown as steering wheel control interface module 802, on the internal communications network 800 (e.g., CAN bus, etc.). Similar to the concrete mixer 10 application (see FIG. 6), the steering wheel control interface module 802 for the refuse truck 50 is configured to communicate with a working component control module over the internal communications network for the vehicle. As shown in FIG. 8, the refuse truck 50 includes multiple working component control modules, shown as refuse container position control module 804, access door position control module 806, compactor control module 808, and rear access door position control module 810. In the exemplary embodiment of FIG. 8, the internal communications network for the refuse truck 50 additionally includes a non-working component control module 812. Again, the non-working component control module 812 may be one of a variety of different non-working component control modules included with the rolling chassis configuration from the OEM.

A variety of different OEM control interfaces may be utilized to control the working components in accordance with the inventive principles disclosed herein. For example, actuators may be provided in other regions of the cab area 16 (see FIGS. 1-2) other than the steering wheel 38 to control the working components of the vehicle (e.g., actuators that are part of the rolling chassis configuration such as actuators on the right side of the steering wheel 38 as shown in FIG. 3, actuators disposed on the center console, etc.). In this way, the steering wheel control interface 300 and the steering wheel control interface module 602, 802 of FIGS. 6 and 8, may be replaced with a control interface and a control interface module, respectively, in another region of the cab area 16.

Figure 9:
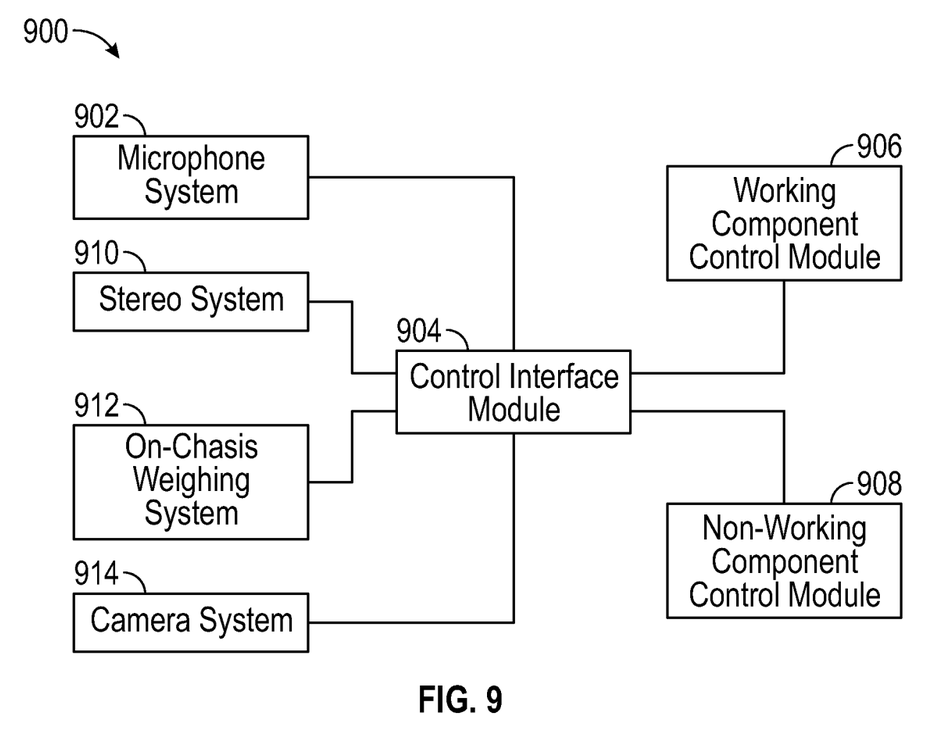
FIG. 9 is a block diagram of an OEM control system of a rolling chassis structure, according to an exemplary embodiment.

In other embodiments, the OEM control interface includes other types of control interfaces (non-actuator-based interfaces, etc.) capable of receiving and transmitting commands and information (e.g., user commands, control signals, etc.). For example, as shown in FIG. 9, an OEM control system 900 includes a hands-free calling system, shown as microphone system 902, included with the rolling chassis structure. According to an exemplary embodiment, the microphone system 902 includes a microphone that provides verbal commands to one or more working components of the vehicle in addition to providing the functionality of a traditional hands-free calling system (e.g., placing calls through a linked Bluetooth phone, or directly through a mobile telematics module). As shown in FIG. 9, the microphone system 902 (e.g., microphone) is communicably coupled to an control interface module 904 (e.g., a touch-free control interface module, etc.) on the internal communications network for the vehicle, through which commands are transmitted to one or more working component control modules 906 and/or non-working component control modules 908. The control interface module 904 may form part of the microphone system 902 or may be shared between multiple OEM control interfaces. In other embodiments, the vehicle includes an intermediate control interface module that receives data from a plurality of OEM control interfaces (e.g., the steering wheel control interface, the hands-free calling system control interface, etc.), and coordinates the control of multiple working component control modules 906 and/or non-working component control modules 908 based on the signals received from each OEM control interface.

In the embodiment of FIG. 9, the OEM control system 900 also includes a stereo system 910 (e.g., radio) that provides audible confirmation (e.g., alerts, notifications, etc.) of the operational status of the working component or commands received by the working component (e.g., commands received from the hands-free calling system and/or another OEM control interface). Among other benefits, repurposing the microphone system 902 and similar OEM control interfaces increases an operator's ability to multitask (e.g., to keep his/her hands on the wheel, to operate another working component in parallel, etc.), thereby increasing overall productivity.

According to another exemplary embodiment, the OEM control system 900 also includes an on-chassis weighing system 912 that prevents the operation of one or more working components under predetermined operating conditions. For example, in a refuse truck application, the on-chassis weighing system 912 may include a scale that is configured to continuously measure a weight of the vehicle (e.g., a weight of the refuse container, an overall weight of the refuse truck, etc.), and to prevent an operator from continuing to load the vehicle past (e.g., beyond) a predetermined threshold (e.g., a gross vehicle weight rating); for example, by preventing an access door position control module from opening, etc. Similar functionality may be provided by utilizing an OEM camera system 914 to monitor a vehicle condition (e.g., an area in front of the vehicle, an area behind the vehicle, and area to the side of the vehicle, an area in which a working component of the vehicle is located, etc.). For example, a camera of the OEM camera system may be utilized to determine whether a person is located in an unsafe position (e.g., in field-of-view of a rear facing camera, near a repositionable rear access door or other working component, etc.) and prevent operation of one or more working components until the user has cleared the operating space.

Referring to the figures generally, the various exemplary embodiments disclosed herein relate to systems and methods for utilizing OEM controls interfaces to control a working component of a vehicle. Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the OEM control interfaces as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A vehicle, comprising:
   a chassis;
   a non-working component coupled to the chassis and configured to facilitate transit operations for the vehicle;
   an application-specific working component coupled to the chassis and forming a body portion of the vehicle, the working component coupled to a hydraulic actuator and configured to move relative to the chassis during application-specific non-transit operations via the hydraulic actuator;
   a control interface module communicably coupled to the working component and the non-working component; and
   a control interface communicably coupled to the control interface module, the control interface including a first actuator configured to receive a user input and to (i) actuate the hydraulic actuator to control operations of the working component during the non-transit operations based on the user input with the control interface module in a first mode of operation and to (ii) control the non-working component during the transit operations based on the user input with the control interface module in a second mode of operation.

2. The vehicle of claim 1, wherein the control interface comprises a plurality of actuators, wherein a second actuator of the plurality of actuators is configured to control the working component, and wherein a third actuator of the plurality of actuators is configured to control the non-working component.

3. The vehicle of claim 1, wherein the control interface comprises a function control switch, wherein the function control switch is configured to toggle between the first mode of operation in which the first actuator controls the working component and the second mode of operation in which the first actuator controls the non-working component.

4. The vehicle of claim 1, further comprising:
   a function control switch, the function control switch configured to toggle between the first mode of operation in which a plurality of actuators of the control interface control the working component and a second mode of operation in which the plurality of actuators of the control interface control the non-working component.

5. The vehicle of claim 1, wherein the vehicle is a refuse truck, and wherein the working component is one of a front-end loading system configured to control a position of a refuse container assembly of the refuse truck, a compaction control system configured to control a position of a compactor of the refuse truck, and an access door position control system configured to control a position of an access door to a refuse container of the refuse truck.

6. The vehicle of claim 1, wherein the vehicle is a concrete mixer, and wherein the working component is one of a drum drive system configured to control rotation of a mixing drum of the concrete mixer, and a chute position control system configured to control a position of a delivery chute of the concrete mixer.

7. The vehicle of claim 1, further comprising:
   a second control interface, the second control interface communicably coupled to the control interface module, the second control interface configured to control the non-working component.

8. The vehicle of claim 7, wherein the control interface module is further configured to change operation of the second control interface to control the operations of the working component.

9. The vehicle of claim 7, wherein the second control interface is a steering wheel control interface comprising a plurality of actuators disposed on a steering wheel of the vehicle, wherein the steering wheel further comprises a steering wheel control interface module that communicably couples the control interface to the non-working component and the working component.

10. A control system, comprising:
a control interface mountable in a cab area of a vehicle, the control interface including a first actuator configured to receive a user command to control an application-specific working component, the working component coupled with a chassis of the vehicle to form a body portion of the vehicle and configured to move relative to the chassis via a hydraulic actuator during application-specific non-transit operations of the vehicle; and
a control interface module communicably coupled to the control interface, the control interface module communicably couplable to the working component and a non-working component of the vehicle, the non-working component configured to facilitate transit operations for the vehicle, the control interface module configured to receive the user command from the control interface and actuate the hydraulic actuator to control the working component during the non-transit operations based on the user command;
wherein the control interface module is configured to change operation of the first actuator of the control interface to cause the first actuator to control the non-working component during the transit operations.

11. The control interface module of claim 10, wherein the control interface comprises a plurality of actuators, wherein a second actuator of the plurality of actuators is configured to generate a non-working component command to control the non-working component, and a third actuator of the plurality of actuators is configured to generate a working component command to control the working component.

12. The control system of claim 10, wherein the control interface comprises a function control switch, wherein the function control switch is configured to toggle between a first mode of operation in which the user commands from the first actuator control the non-working component and a second mode of operation in which the user commands from the first actuator control the working component.

13. The control system of claim 10, further comprising:
a function control switch, the function control switch configured to toggle between a first mode of operation in which a plurality of actuators of the control interface control the working component and a second mode of operation in which the plurality of actuators of the control interface control the non-working component.

14. The control system of claim 10, wherein the vehicle is one of a refuse truck or a concrete mixer, and wherein movement of the working component relative to a chassis of the vehicle comprises a rotation, extension, retraction, or translation of the working component relative to the chassis via actuation of the hydraulic actuator.

15. The control system of claim 10, further comprising:
a second control interface, the second control interface communicably coupled to the control interface module, the second control interface configured to control the non-working component.

16. The control system of claim 15, wherein the control interface module is further configured to change operation of the second control interface to control operations of the working component.

17. The control system of claim 15, wherein the second control interface is a steering wheel control interface comprising a plurality of actuators disposed on a steering wheel of the vehicle, and wherein the user commands are generated by manually manipulating the plurality of actuators.

18. A vehicular communications network comprising:
a plurality of control modules including:
a first control module configured to control operation of an application-specific working component of a vehicle, wherein the working component is coupled with the vehicle to form a body portion of the vehicle and is coupled to a hydraulic actuator, wherein the hydraulic actuator is configured move the working component relative to the vehicle to facilitate application-specific non-transit operations;
a second control module configured to control operation of a non-working component of the vehicle, wherein the non-working component is configured to facilitate transit operations of the vehicle;
a control interface, the control interface including an actuator configured to receive user commands and control at least one of the plurality of control modules, the control interface having a plurality of operation modes including a first operation mode in which the user commands received by the actuator control the first control module during the non-transit operations, and a second operation mode in which the user commands received by the actuator control the second control module during the transit operations; and
a control interface module communicably coupled to the control interface and the plurality of control modules, the control interface module configured to change the operation mode of the control interface between the first operation mode and the second operation mode.

19. The vehicular communications network of claim 18, wherein the control interface module is communicably coupled to the plurality of control modules and the control interface via a controller area network.

20. The vehicular communications network of claim 18, wherein the control interface further includes a third operation mode in which the user commands received by the actuator control the first control module and the second control module.

* * * * *

UNITED STATES PATENT AND TRADEMARK OFFICE
CERTIFICATE OF CORRECTION

| | | |
|---|---|---|
| PATENT NO. | : 11,897,401 B2 | Page 1 of 1 |
| APPLICATION NO. | : 17/372041 | |
| DATED | : February 13, 2024 | |
| INVENTOR(S) | : Wildgrube et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 199 days.

Signed and Sealed this
Thirtieth Day of September, 2025

John A. Squires
*Director of the United States Patent and Trademark Office*